US007778624B2

(12) United States Patent
Li

(10) Patent No.: US 7,778,624 B2
(45) Date of Patent: Aug. 17, 2010

(54) OUTDOOR UMBRELLA WITH AUDIO SYSTEM

(76) Inventor: Wanda Ying Li, 121 E. Alton, Santa Ana, CA (US) 92720

( * ) Notice: Subject to any disclaimer, the term of this patent is extended or adjusted under 35 U.S.C. 154(b) by 523 days.

(21) Appl. No.: 11/515,134

(22) Filed: Sep. 1, 2006

(65) Prior Publication Data

US 2008/0076379 A1 Mar. 27, 2008

(51) Int. Cl.
*H04B 1/06* (2006.01)

(52) U.S. Cl. .................................................... 455/344

(58) Field of Classification Search ................. 455/344; 381/103

See application file for complete search history.

(56) References Cited

U.S. PATENT DOCUMENTS 4,915,670 A * 4/1990 Nesbit ........................ 455/344
6,298,866 B1 * 10/2001 Molnar, IV .................. 135/16
2005/0069153 A1 * 3/2005 Hall et al. ................... 381/103
2007/0254695 A1 * 11/2007 Langberg et al. ......... 455/556.1

FOREIGN PATENT DOCUMENTS

WO WO 2004/088076 A1 * 10/2004

OTHER PUBLICATIONS

Soundcast Amplified Products (Jun. 12, 2006). Marketing Requirments Document for Soundcast Amplified Products[ Private Company Release]. Retrieved from personal communication and http://www.soundcastsystems.com/products/outcast.*

Soundcast Amplified Products (Aug. 29, 2006). Phase 2 Design Document for Parycast [Private Company Release]. Retrieved from personal communication.*

* cited by examiner

*Primary Examiner*—Matthew D Anderson
*Assistant Examiner*—David Bilodeau
(74) *Attorney, Agent, or Firm*—Raymond Y. Chan; David and Raymond Patent Firm

(57) ABSTRACT

An outdoor umbrella includes a supporting frame, an awning frame and an audio system. The awning frame includes a functional umbrella hub suspendedly supported by the supporting frame, a plurality of awning frames radially and outwardly extended from the functional umbrella hub, and an awning supported by the awning arms to define a shading area under the awning, wherein the functional umbrella hub has a speaker compartment and an audio outlet. The audio system, as a built-in sound system includes a control panel supported at the supporting frame for inputting an audio signal, and a speaker unit. The speaker unit is supported within the speaker compartment of the functional umbrella hub to align with the audio outlet, wherein when the audio signal is input at the control panel, the audio signal is transmitted to the speaker unit for generating an audio sound as an additional function for the outdoor umbrella.

13 Claims, 13 Drawing Sheets

OUTDOOR UMBRELLA WITH AUDIO SYSTEM

BACKGROUND OF THE PRESENT INVENTION

1. Field of Invention

The present invention relates to an outdoor umbrella, and more particularly to an outdoor umbrella comprising an audio system which is capable of generating a wide range of audio signal from different signal sources, such as a MP3 player.

2. Description of Related Arts

A conventional outdoor umbrella usually comprises a supporting frame, an awing frame movably supported on the supporting frame, and an awning fabric supported on the awning frame for proving shading in a shading area under the awing fabric. Conventionally, the outdoor umbrella is usually foldable so that when it is not in use, the outdoor umbrella can be folded into a compact size for convenient transport and storage.

People usually use the conventional outdoor umbrella for a wide variety of outdoor activities. For example, people may use the outdoor umbrella during camping for providing some sort of shielding from sunlight. Very often, when people are using the outdoor umbrella in outdoor environment, they need something more, apart from shading, to accomplish their intended activities. For instances, they require light during night time and they may need fans when the weather is too hot. As a result, they may bring their own light and fans to the intended activities and this may create great trouble to them.

Therefore, this is the main disadvantage to conventional outdoor umbrella I in that a typical outdoor activity usually requires a wide range of electrical appliances, such as lighting devices, audio devices, or ventilating devices for providing extra support to the activities being held. Thus, users of the conventional outdoor umbrella usually need to bring their own electrical appliances and plan in advance as to how to securely locate those electrical appliances. For example, they have to plan in advance as to how to mount lighting devices onto the outdoor umbrella. They also have to consider how to get power to light up all the electrical appliances.

As a matter of fact, there exist some outdoor umbrellas which comprise some sorts of built-in electrical appliances such as lighting devices. However due to power availability, mounting limitation and ease of control, there are currently very few, if not no, comprehensive outdoor umbrella which is capable of providing electrical appliances other than lighting devices. Moreover, even though there exist some outdoor umbrellas which have more than one built-in electrical appliances, their control mechanisms and power retrieval strategy are by no means troublesome. For instances, one may need to prepare a lot of batteries for powering up all of the electrical appliances.

Another problem, however, may exist. Since the outdoors umbrellas have to support many electrical appliances with proper electrical connection, it becomes more difficult for the usual folding or unfolding mechanisms to operate. In short, the electrical appliances may actually affect the operation of the outdoor umbrellas so as to defeat the very purpose of having those outdoor umbrellas.

SUMMARY OF THE PRESENT INVENTION

A main object of the present invention is to provide an outdoor umbrella comprising an audio system which is capable of generating a wide range of audio signal from different signal sources, such as a MP3 player.

Another object of the present invention is to provide an outdoor umbrella comprising an audio system, wherein the audio system can be comprehensively controlled by a control panel conveniently positioned on the outdoor umbrella so as to maximize the ease of operation of the audio system on the outdoor umbrella.

Another object of the present invention is to provide an outdoor umbrella comprising an audio system which can be powered by a wide range of electrical power source so as to maximize the situation in which the audio system could be utilized for optimal entertainment while the outdoor umbrella is erected.

Another object of the present invention is to provide an outdoor umbrella comprising an audio system, wherein the audio system is securely mounted onto the outdoor umbrella without affecting the operation of the outdoor umbrella.

Accordingly, in order to accomplish the above objects, the present invention provides an outdoor umbrella, comprising:

a supporting frame;

an awning frame which comprises a functional umbrella hub suspendedly supported by the supporting frame, a plurality of awning frames radially and outwardly extended from the functional umbrella hub, and an awning supported by the awning arms to define a shading area under the awning, wherein the functional umbrella hub has a speaker compartment and an audio outlet; and an audio system, as a built-in sound system, comprising:

a control panel supported at the supporting frame, for inputting an audio signal; and a speaker unit supported within the speaker compartment of the functional umbrella hub to align with the audio outlet, wherein when the audio signal is input at the control panel, the audio signal is transmitted to the speaker unit for generating an audio sound as an additional function for the outdoor umbrella.

These and other objectives, features, and advantages of the present invention will become apparent from the following detailed description, the accompanying drawings, and the appended claims.

DETAILED DESCRIPTION OF THE PREFERRED EMBODIMENT

Figure 1:
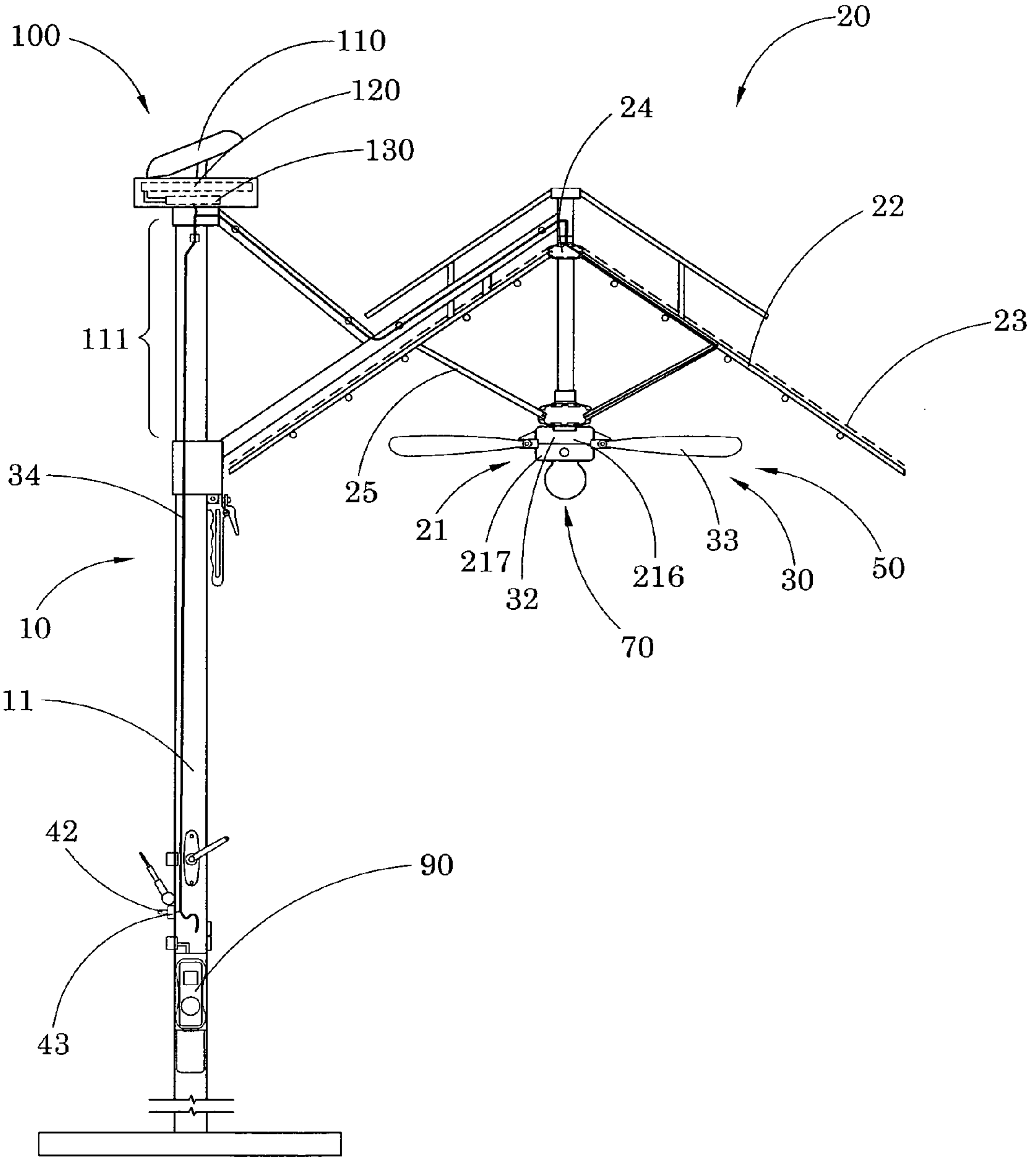
FIG. 1 is a perspective view of an outdoor umbrella according to a preferred embodiment of the present invention.

Referring to FIG. 1 to FIG. 4, and FIG. 6 and FIG. 7 of the drawings, an outdoor umbrella according to a preferred embodiment of the present invention is illustrated, in which the outdoor umbrella comprises a supporting frame 10, an awning frame 20, a ventilation arrangement 30, and a connector head 60.

The awning frame 20 comprises a functional umbrella hub 21 suspendedly supported by the supporting frame 10, a plurality of awning arms 22 radially and outwardly extended from the functional umbrella hub 21, and an awning 23 supported by the awning arms 22 to define a shading area under the awning 23.

The functional umbrella hub 21 further comprises a functional appliance for electrically connecting with the connector head 60, wherein the functional appliance comprises is embodied as a wide range of electrical appliances adapted for being installed onto the outdoor umbrella, such as the ventilation arrangement 30.

The ventilation arrangement 30 comprises a ventilation power unit 31 supporting at the functional hub 21, a driving rotor 32 rotatably and coaxially mounted at an outer wall of the functional umbrella hub 21 to electrically couple with the ventilation power unit 31, and a plurality of fan blades 33.

The plurality of fan blades 33 is spacedly mounted to the driving rotor 32 such that when the driving rotor 32 is driven to rotate, the fan blades 33 are swinging for creating airflow under the awning arms 12 within the shading area, so as to provide a ventilating effect as an additional function for the outdoor umbrella.

According to the above preferred embodiment of the present invention, the umbrella frame 10 comprises a hollow supporting shaft 11 adapted for securely standing on a ground surface for suspendedly supporting the awning frame 20 and the ventilation arrangement 30. On the other hand, the awning frame 20 further comprises an upper housing 24 suspendedly supported by the hollow supporting shaft 11, in which the awning frame 20 is radially extended from the upper housing 24 for moving between a folded position and an unfolded position. When the awning frame 20 is in the folded position, the awning frame is pivotally folded towards each other to form a compact structure of the outdoor umbrella, and when the awning frame 20 is in the unfolded position, the awning frame 20 is radially, outwardly and pivotally extended to shade sunlight in the shading area defined by the awning 23.

Moreover, the awning frame 20 further comprises a plurality of awning supporting member 25 each of which is movably extended from the functional umbrella hub 21 to the respective awning arms 22 for movably supporting the awning frame 20 to move between the folded position and the unfolded position.

In order to control an operation of the ventilation arrangement 30, the outdoor umbrella further comprises a control panel 40 supported at the supporting frame 10 to electrically control the ventilation arrangement 30, wherein the control panel 40 comprises a control switch 41 operatively connected to the ventilation power unit 31 to adjustably control the operation parameters, such as rotational speed, of the driving rotor 32 so as to control the operation of the driving rotor 32 for generating an optimal airflow of the outdoor umbrella.

Thus, the hollow supporting shaft 11 of the supporting frame 10 has an upper portion 111 coupling with the awning frame 20, wherein the ventilation arrangement 30 further comprises an extending cable 34 electrically extending from the control panel 40 to the ventilation power unit 31 through the supporting shaft 11 so as to conceal the extending cable 34 in a hidden manner. As a result, the extending cable 34 is physically protected and aesthetically hidden by the hollow supporting shaft 11 so as to maintain the maximum life span and optimal aesthetic appearance of the present invention.

Figure 2:
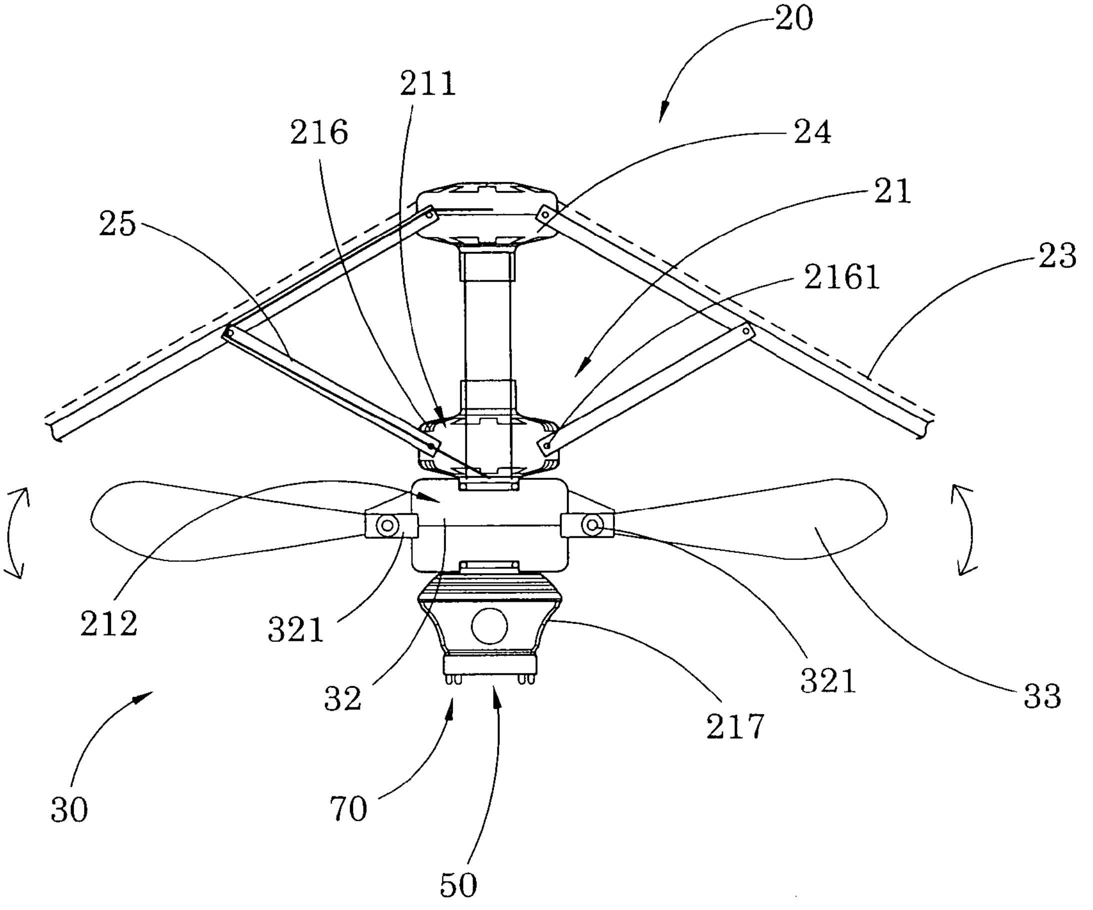
FIG. 2 is a schematic diagram of the outdoor umbrella according to the above preferred embodiment of the present invention.
Figure 3:
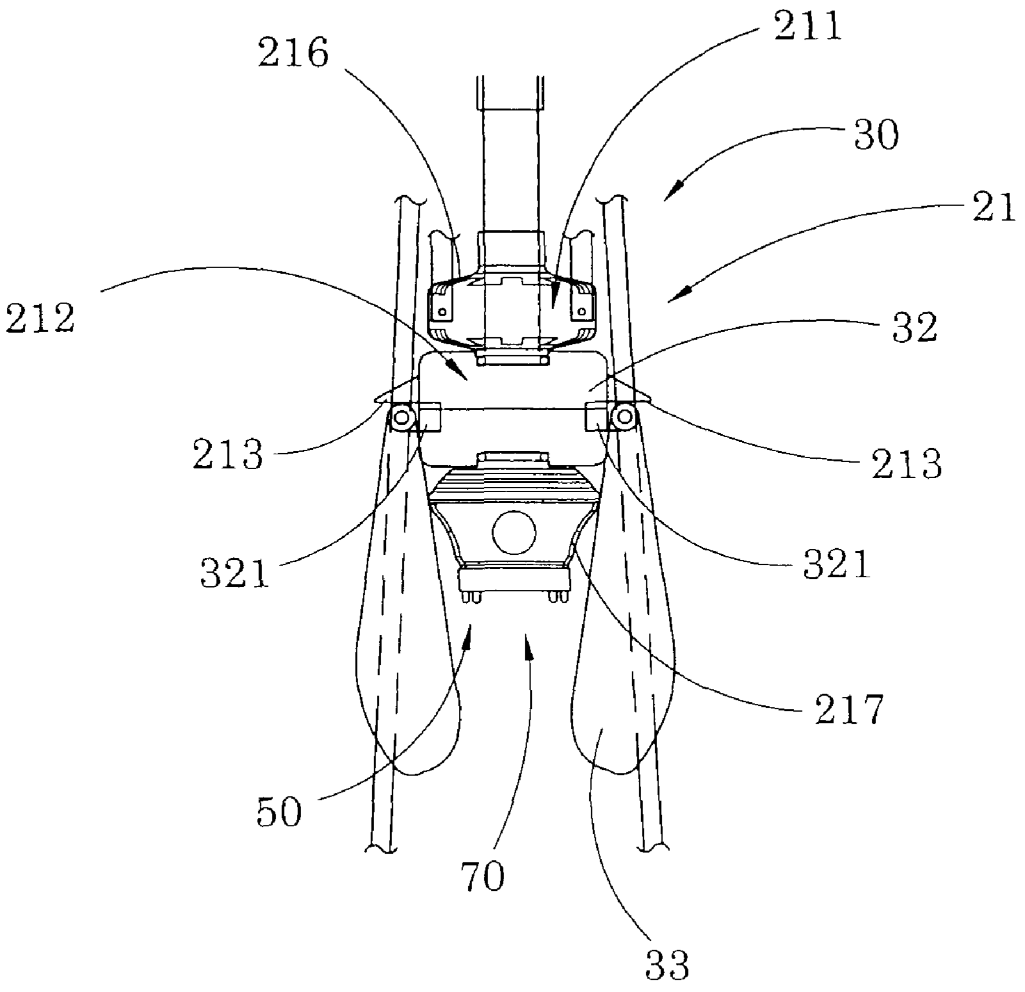
FIG. 3 is a schematic diagram of the ventilation arrangement according to the above preferred embodiment of the present invention.

Referring to FIG. 2 to FIG. 3 of the drawings, each of the fan blades 33 is made of soft fabric material so that when the driving rotor 32 is in an idle position, the fan blades are suspended at the functional umbrella hub 21, and when the driving rotor 32 is in an operative rotating position, the fan blades 31 are swinging by means of centrifugation force for creating the ventilating effect in the shading area. Thus, one may appreciate that since the fan blades 33 are made of soft fabric materials, they do not interfere with the normal operation of the outdoor umbrella because their shape is changeable for fitting the folding and unfolding operation of the outdoor umbrella.

In order to effectively and efficiently create adequate degree of airflow within the shading area, the driving rotor 32 further comprises a plurality of angled blade hinges 321 securely attaching inner ends of the fan blades 33 respectively at a predetermined angle, such that when the driving rotor 32 is driven to rotate, the fan blades 33 are inclinedly swinging with respect to the driving rotor 32 so as to create an effective and efficient airflow within the shading area.

The ventilation power unit 31 comprises a ring-shaped induction coil 311 supported in the functional umbrella hub 21 to coaxially align with the driving rotor 32 so as to drive the driving rotor 32 to rotate by induction.

The control panel 40 further comprises a temperature sensor 42 supported by the supporting frame 10 for detecting an ambient temperature and a sensor circuit 43 which is electrically communicating with the temperature sensor 42 and is arranged in such a manner that when the ambient temperature is higher than a user-preset temperature, the sensor circuit 43 automatically activates the ventilation power unit 31 to drive the driving rotor 32 to rotate to create the airflow in the shading area. In other words, the ventilation arrangement 30 can either be activated manually through the control panel 40, or by ambient temperature rising above a predetermined threshold. In the latter case, the ventilation arrangement 30 is activated automatically by the sensor circuit 43.

Furthermore, the control panel 40 further comprises a circuit transformer 44 electrically connecting with the ventilation arrangement 30 for transforming an AC power from an external power source to a DC power for the ventilation power unit 31. Thus, the ventilation arrangement 30 is adapted for being powered up by an external power source for prolonged use of the ventilation system. Alternatively, the ventilation arrangement 30 can also be powered by rechargeable batteries for shorter usage duration.

As a further alternative, the outdoor umbrella can further comprise a solar energy power system 100 which comprises a solar energy collection board 110 and a solar energy conversion circuit 120 mounted on the supporting frame 10. The solar energy collection board 110 is adapted to collect solar energy from sunlight, wherein the sunlight will be transformed to electric energy by the solar energy conversion circuit 120 for providing adequate power to operate the electrical appliances installed on the outdoor umbrella. The transformed energy is to be stored by a rechargeable battery 130 electrically connected with the solar energy conversion circuit 120.

In order to securely mount the ventilation arrangement 30 onto the supporting frame 10 and the awning frame 20, the functional umbrella hub 21 of the awning frame 20 has an upper portion 211 coupling with the awning arms 22 via the awning supporting members 25, a lower portion 212 receiving the ventilation power unit 31 therein, and a rotor seat 213 provided at an outer wall of the lower portion 212 to retain the driving rotor 32 in a rotatably movable manner.

Apart from the ventilation system, the outdoor umbrella according to the preferred embodiment is meant to accommodate a wide range of other electrical appliances so as to provide a wide range of accessory functions to outdoor activities.

Figure 6:
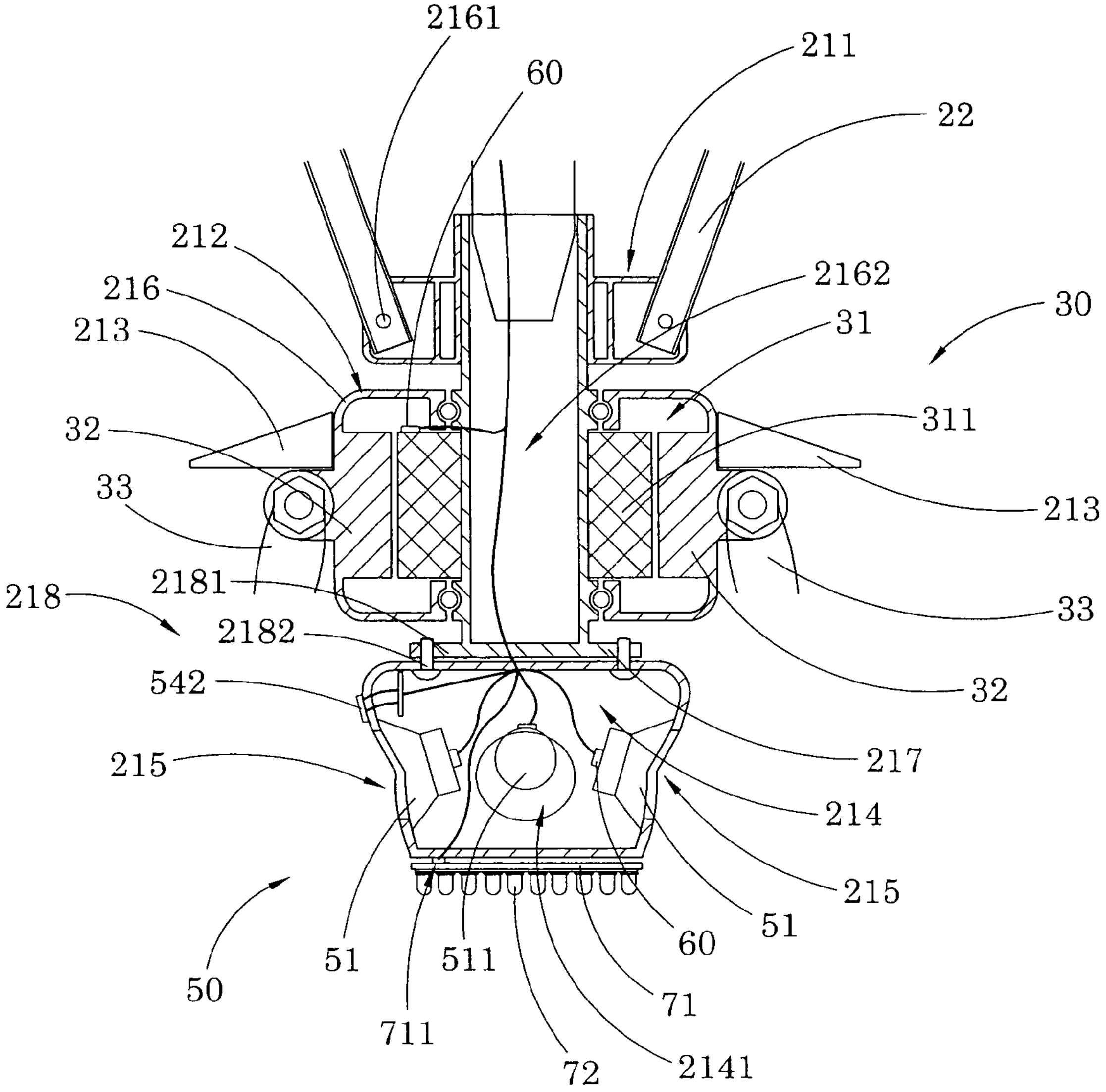
FIG. 6 is a sectional side view of the functional umbrella hub according to the above preferred embodiment of the present invention.

According to the preferred embodiment of the present invention, the functional umbrella hub 21 further has a speaker compartment 214 and at least one audio outlet 215, whereas the outdoor umbrella further comprises an audio system 50, as a built-in sound system, comprising a speaker unit 51 supported within the speaker compartment 214 of the functional umbrella hub 21 to align with the audio outlet 215, wherein when the audio signal is input at the control panel 40 via the audio outlet, the audio signal is transmitted to the speaker unit 51 for generating an audio sound as an additional function for the outdoor umbrella, as shown in FIG. 6 of the drawings.

The control panel 40 further comprises an auxiliary input 45 for communicatively connecting to a portable music player 90 to receive the audio signal therefrom, such that the control panel 40 transmits the audio signal to the speaker unit 51 for music broadcasting. The audio system 50 of the present invention is adapted to play music originated from a wide variety of conventional portable music players 90, such as CD players, DVD players, MP3 and the like for providing the maximum number of audio options for the user of the present invention.

The audio system 50 further comprises a sealing holder 52 mounted at the supporting frame 10 at a position adjacent to the control panel 40 for holding the portable music player 90 in the sealing holder 52 in a waterproof enclosing manner. Thus, the portable music player 90 is substantially protected from adverse environment factors and weather condition.

Figure 4:
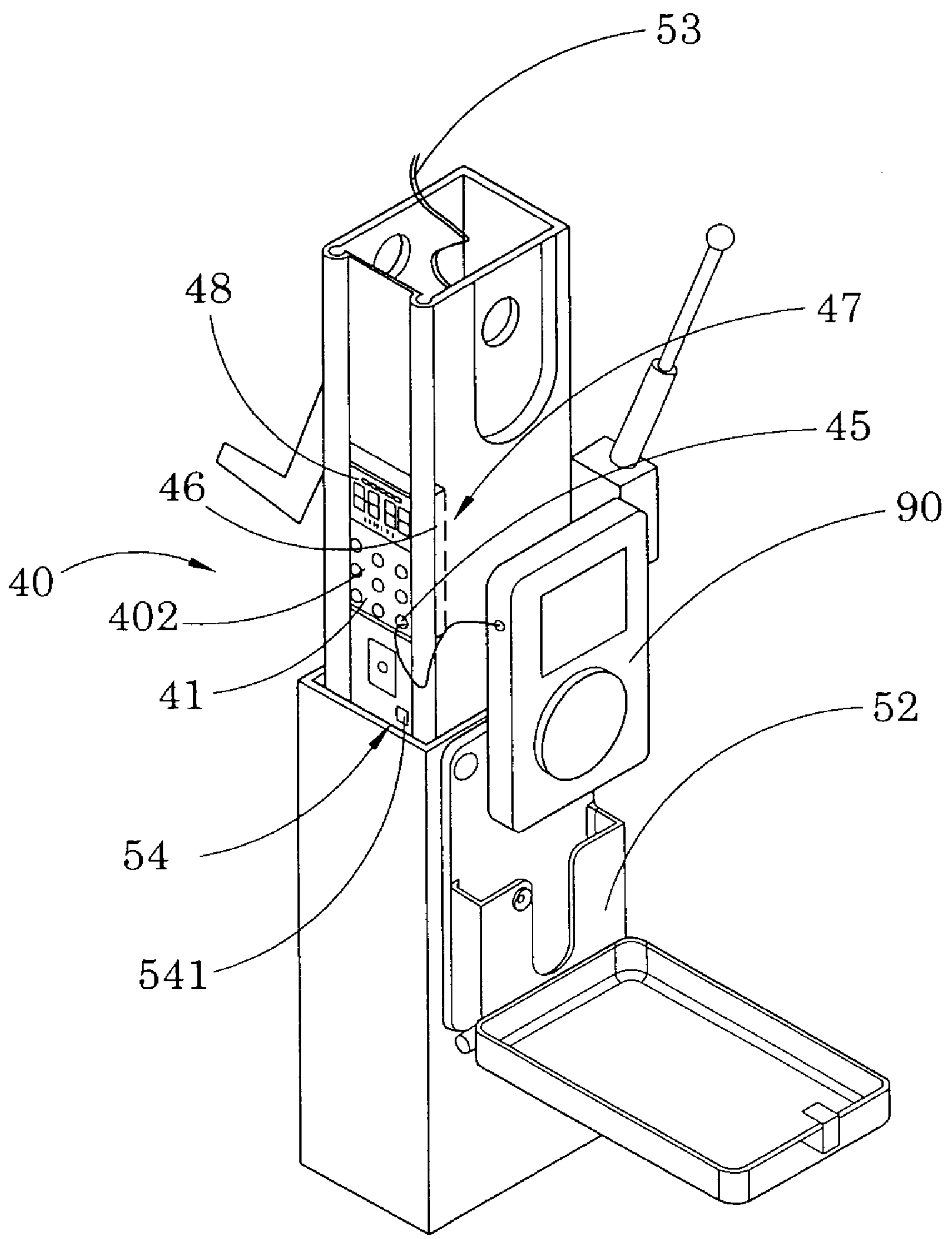
FIG. 4 is a perspective view of the control panel according to the above preferred embodiment of the present invention.

Referring to FIG. 4 of the drawings, in order to further enhance the source by which audio sound signal can be acquired, the control panel 40 further comprises a radio broadcasting circuit 46 for receiving radio wave as the audio signal, such that the control panel 40 transmits the audio signal to the speaker unit 51 for radio broadcasting. As such, the audio system 50 is also capable of processing radio signal for delivering radio sound signal as the audio signal as mentioned above.

The audio system 50 further comprises an audio transmitting cable 53 extending from the control panel 40 to the speaker 51 through the hollow supporting shaft 11 so as to transmit the audio signal from the control panel 40 to the speaker unit 51 via the audio transmitting cable 53 securely received in the hollow supporting shaft 11.

Alternatively, the audio system 50 further comprises a wireless transmission link 54 for wirelessly transmitting the audio signal from the control panel 40 to the speaker unit 51, wherein the wireless transmission link 54 comprises a wireless transmitter 541 integrated with the control panel 40 and a wireless receiver 542 which is integrated with the speaker unit 51 and is wirelessly communicating with the wireless transmitter 541 to wirelessly transmit the audio signal from the control panel 40 to the speaker unit 51. In this situation, the audio transmitting cable 53 may not be necessary, yet it can still be used in conjunction with the wireless transmission link 54 to cater for different needs.

Accordingly, the control panel 40 further comprises a control circuitry 47 operatively connecting to the speaker unit 51 of the audio system 50 to selectively operate and control the speaker unit 51, and a display screen 48 electrically connected to the control circuitry 47 for displaying an operation status thereof. As a result, the user is able to conveniently monitor the operation of the audio system 50 in a single display device, i.e. the display screen 48.

The speaker unit 51 comprises a plurality of speakers radially supported within the speaker compartment 214 of the awning frame 20 for creating a stereo surround sound effect when the audio signal is transmitted to the speaker unit 51.

In order to enhance the sound quality delivered by the audio system, the functional umbrella hub 21 further has a resonance chamber 2141 formed at the speaker compartment 214, wherein the speaker unit 51 further comprises a subwoofer speaker 511 supported at the resonance chamber 2141 for generating special sound quality of the audio sound output from the speaker unit 51, as shown in FIG. 6 of the drawings.

The functional umbrella hub 21 further comprises a hub body 216 having a plurality of hinges 2161 for respectively coupling with the awning arms 22 in a radially extending manner preferably via the awning supporting arms 25, and an interior cavity 2162 for the connector head 60 disposing therein.

More specifically, the functional umbrella hub 21 further comprises a functional hub 217, which is downwardly extended from the hub body 216 to communicate with the interior cavity 2162 thereof, having the speaker compartment 214 and the audio outlet 215, wherein the functional appliance is built-in with the functional hub 217 that the speaker is securely supported within the speaker compartment 214 at the audio outlet 215 such that the functional umbrella hub 21 is adapted for not only operatively incorporating with the outdoor umbrella via the hub body 216 but also providing the additional function for the outdoor umbrella via the functional hub 217 to enhance a practical use thereof.

Referring to FIG. 6 of the drawings, the functional appliance further comprises a light arrangement 70 provided at a bottom side of the functional hub 217 for electrically connecting with the connector head 60 so as to generate a light illumination as another additional function for the outdoor umbrella. More specifically, the light arrangement 70 comprises a ring-shaped light housing 71, having a connector inlet 711 for electrically connecting to the connector head 60, mounted to the bottom side of the functional hub 217, and a plurality of illumination elements 72 spacedly and coaxially mounted at the light housing 71 for illuminating an area under the awning arms 22, i.e. the shading area. Note that the illumination elements 72 are a plurality of LEDs electrically and spacedly mounted at the light housing 71.

The functional hub 217 is integrally extended from the hub body 216 to form a one-piece integral hub for allowing the connector head 60 extending into the functional hub 217 from the interior cavity 2162 of the hub body 216.

The functional umbrella hub 21 further comprises a mounting unit 218 for detachably mounting the functional hub 217 under the hub body 216, wherein the mounting unit 218 comprises a retaining panel 2181 integrally formed at the bottom side of the hub body 216, and at least a fastening element 2182 detachably fastening the functional hub 217 at the retaining panel 2181 to detachably mount the functional hub 217 to the hub body 216.

The light arrangement 70 may also comprise a ring-shaped light tube 73 mounted at the light housing 71 for illuminating an area under the awning arms 22. Thus, the light tube is capable of providing uniform line of light source for the shading area, a shown in FIG. 8C of the drawings.

Figure 7:
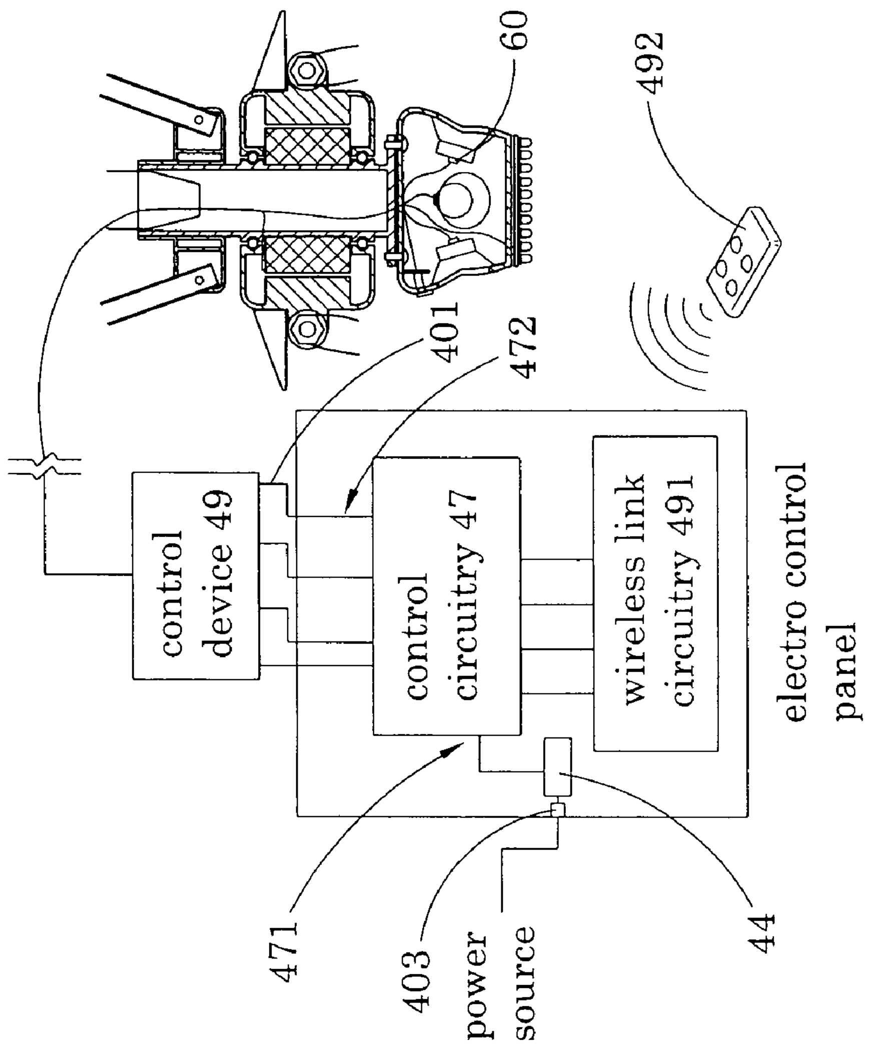
FIG. 7 is a schematic diagram of the electro-control panel according to the above preferred embodiment of the present invention.

Referring to FIG. 7 of the drawings, the control panel 40 is preferably embodied as an electro-control panel which is electrically controlled and operated for providing optimal control to the electrical appliances of the outdoor umbrella.

More specifically, the control panel 40 comprises the control circuitry 47 having an input terminal 471 adapted for electrically connecting to a power source, and a plurality of control terminals 472 for selectively connecting to the electrical appliances respectively. The control panel 40 further comprises a control device 49 electrically connecting to the control circuitry 47 for selectively controlling each of the electrical appliances in an on-and-off manner.

In order to connect with the functional umbrella hub 21, the control panel 40 as the electro-control panel further comprises a plurality of extending cables 401 electrically extending from the control terminals 472 respectively to the awning frame 20 through the hollow supporting shaft 11 in a pre-wiring manner.

Each of the extending cables 401 has the connector head 60 extended to the functional umbrella hub 21 through the hollow supporting shaft 11 for electrically connecting the corresponding electric appliance such that the outdoor umbrella is adapted for incorporating with the electric appliances as add on electric appliances, such as the ventilation arrangement 30, to provide additional functions of the outdoor umbrella when the corresponding electric appliance is mounted at the functional umbrella hub 21 and is electrically connected to the connector head 60.

Moreover, the electro-control panel further comprises a panel housing 402 built-in with the supporting frame 10 that the panel housing 402 is provided at a peripheral wall of the supporting frame 10 to protectively receive the control circuitry 47 in the panel housing 402. Thus, the user is able to control the electrical appliances by simply operating the control panel 40 at the panel housing 402.

Figure 5:
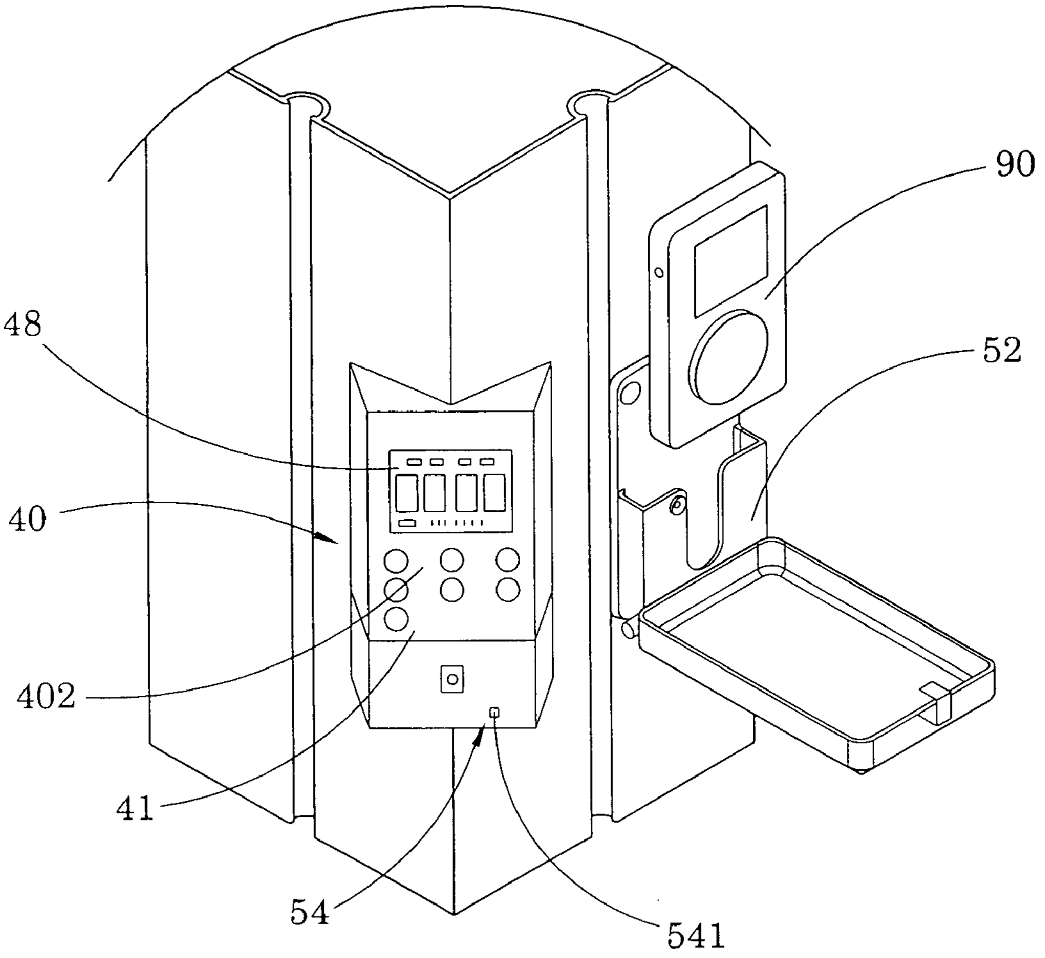
FIG. 5 is a slight alternative of the control panel according to the above preferred embodiment of the present invention.

It is worth mentioning that the panel housing 402 can be installed on the hollow supporting shaft 11 in different manner. For example, as shown in FIG. 4 of the drawings, the panel housing 402 can be installed at an outer peripheral surface of the hollow supporting shaft 11. Alternatively, as shown in FIG. 5 of the drawings, the panel housing 402 can be mounted at an outer corner portion of the hollow supporting shaft 11.

The control device 49 comprises the plurality of control switches 41 which are spacedly provided on the panel housing 402 and are electrically connected to the control terminals 472 of the control circuitry 47 respectively for manually controlling the corresponding electrical appliances in an on-and-off manner. Moreover, the display screen 48 is provided on the panel housing 402 and is electrically connected to the control circuitry 47 for displaying an operation status of each of the electrical appliances.

The control panel 40 as the electro-control panel further comprises an electric socket 403 which is provided on the supporting frame 10 and is electrically connected to the input terminal 471 for electrically connecting to a power source, such as an AC power source.

Accordingly, the circuit transformer 44 electrically connects the electric socket 403 with the input terminal 471 of the control circuitry 47 for transforming an AC power from the external AC power source to a DC power so as to supply a predetermined amount of electricity to the electric appliances.

The control circuitry 47 comprises the integrated radio broadcasting circuit 46 and the auxiliary input 45 for communicatively connecting to a portable music player 90, such that the control circuitry 47 provides an added audio function for incorporating with the electric appliances.

The control device 49 further comprises a wireless link circuitry 491 integrated with the control circuitry 47, and a remote control 492 wirelessly communicating to the wireless link circuitry 491 to control the control circuitry 47 for remotely controlling the electric appliances in a wireless manner.

Figure 8A:
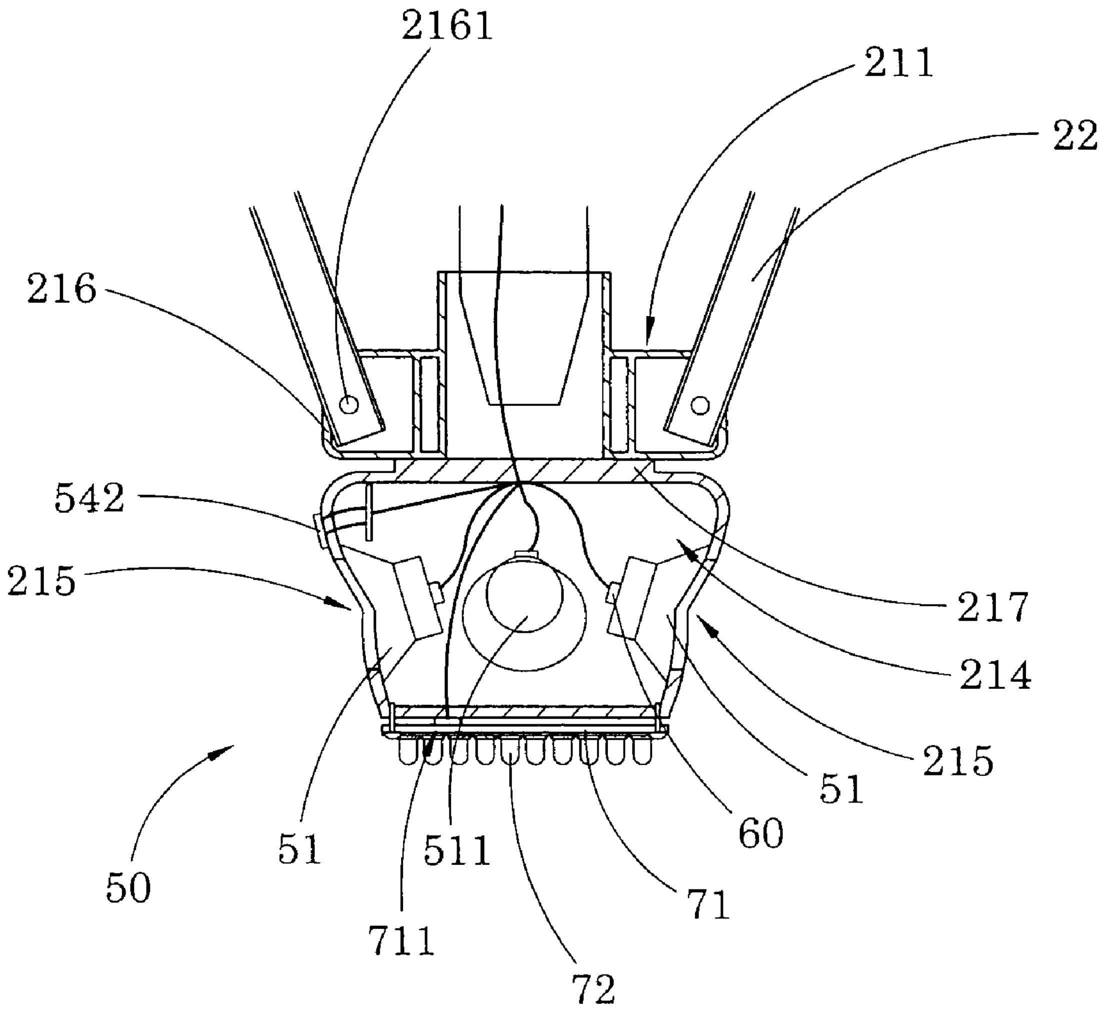
FIG. 8A to FIG. 8C are schematic diagrams of different combinations of electrical appliances according to the above preferred embodiment of the present invention.
Figure 8B:
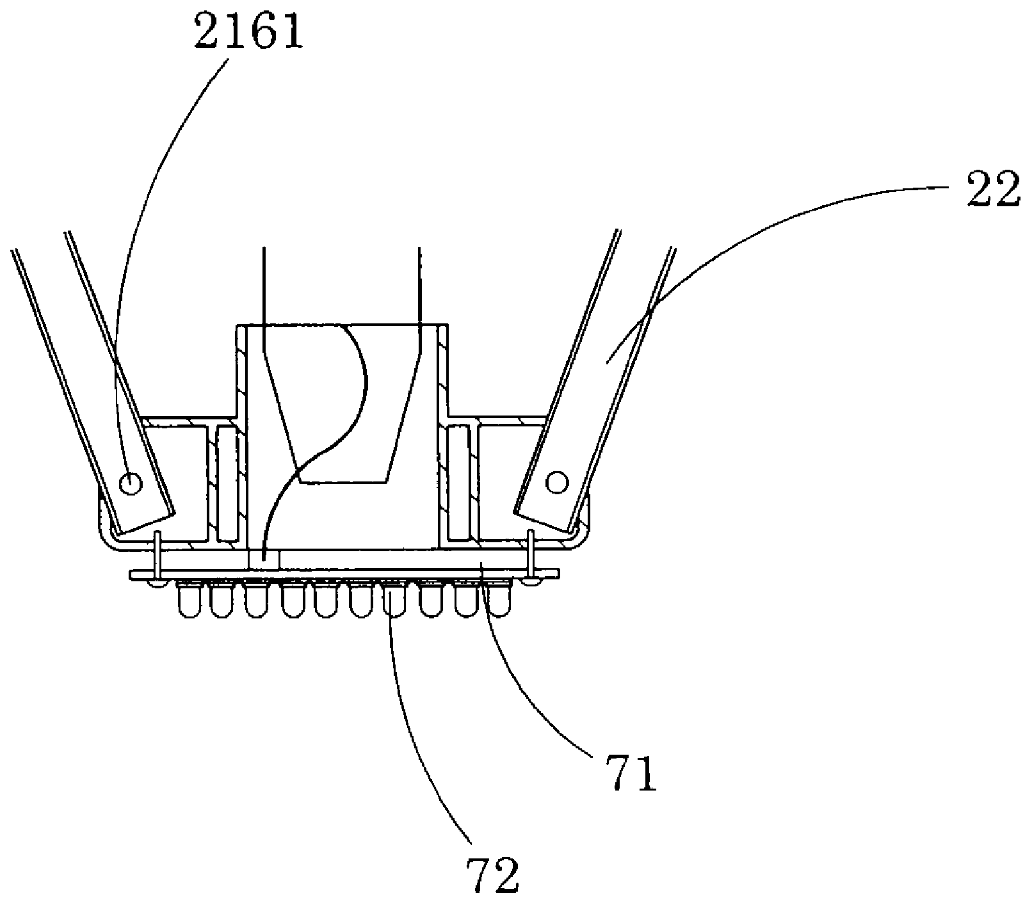
Figure 8C:
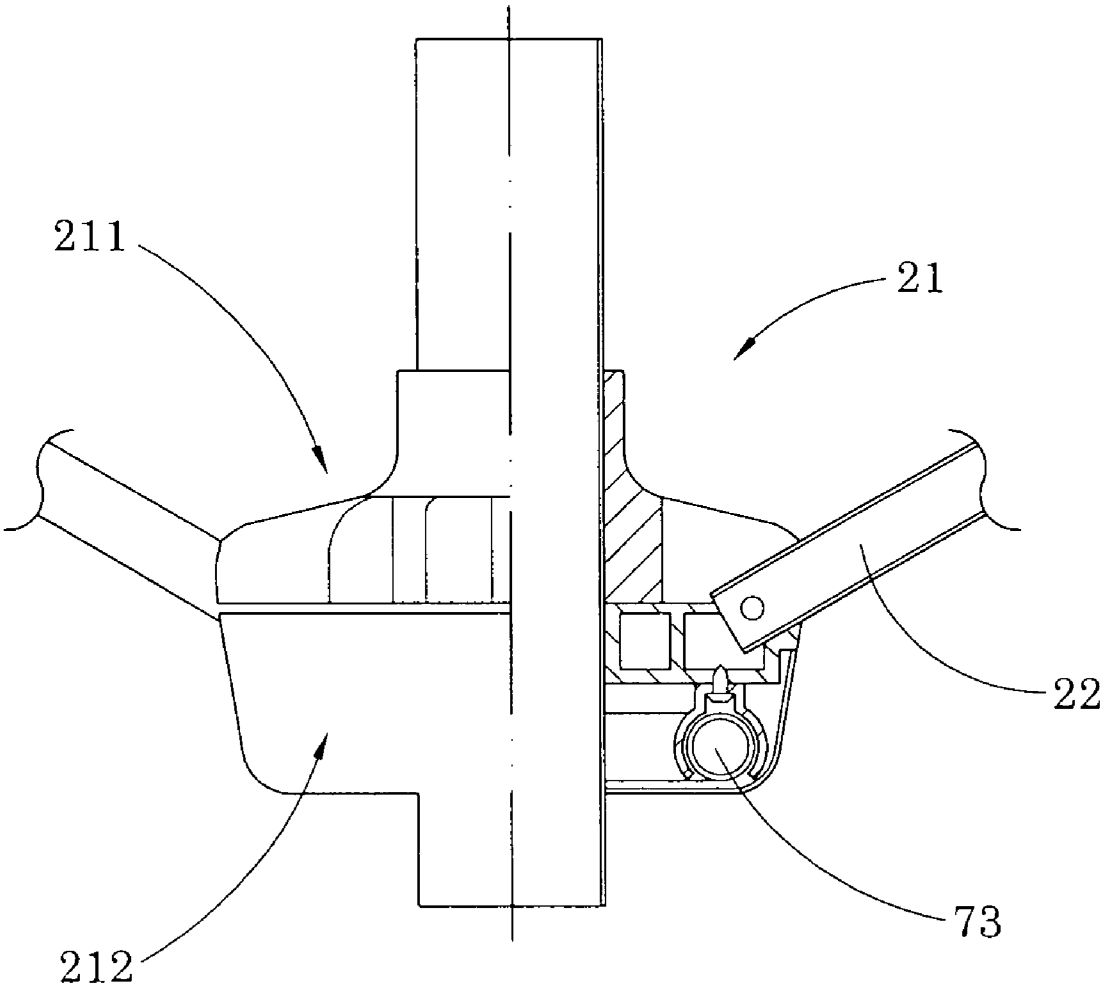

It is worth mentioning that the outdoor umbrella may form different embodiments with different combinations of electrical appliances. Referring to FIG. 8A of the drawings, the outdoor umbrella comprises the audio system 50, the light arrangement 70, but not the ventilation arrangement. Referring to FIG. 8B of the drawings, only the light arrangement 70 has been installed, and in FIG. 8C of the drawings, one may appreciate that the illumination elements 72 are embodied as the ring-shape light tube 73.

Figure 9:
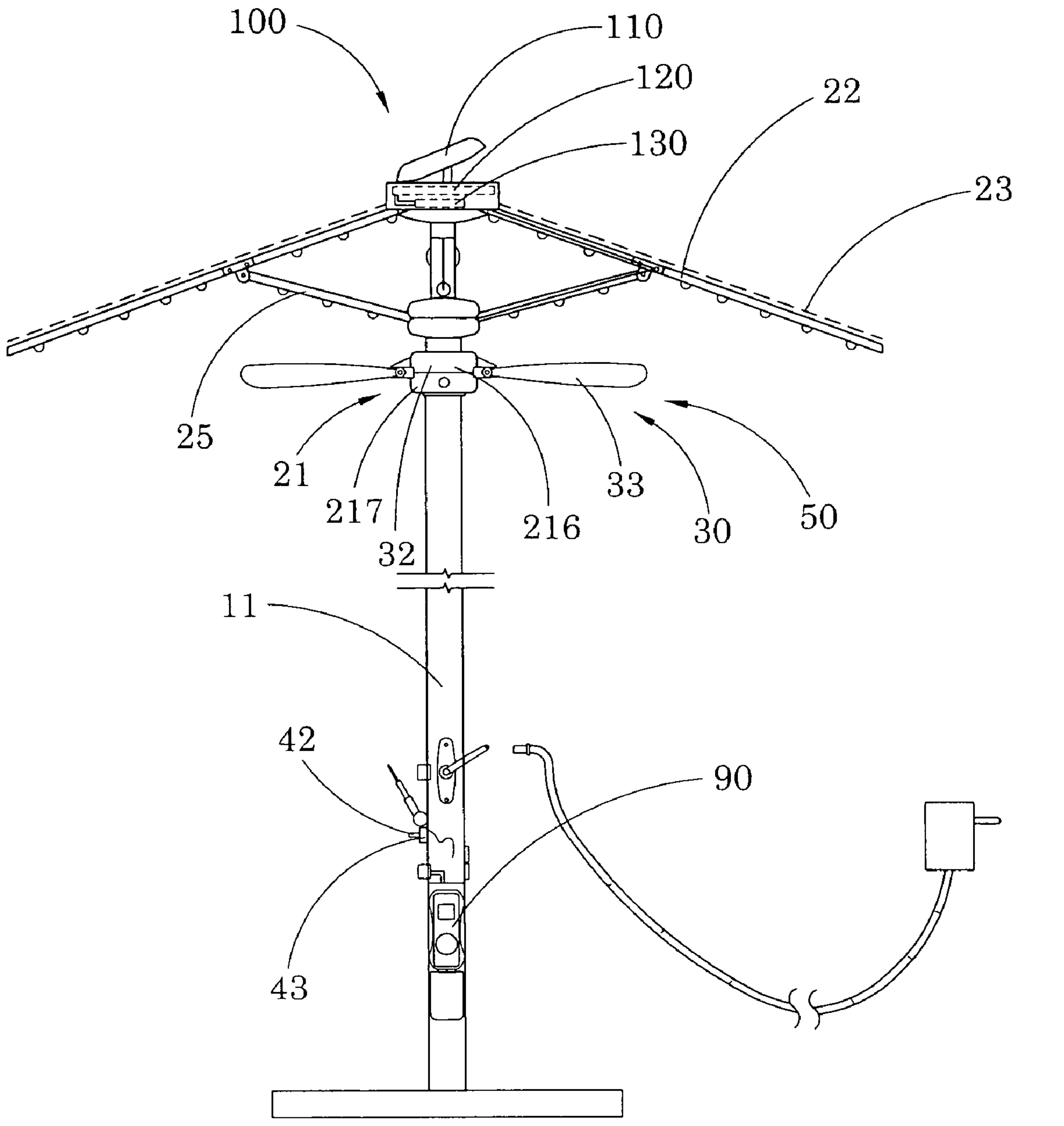
FIG. 9 is an alternative form of the supporting frame of the outdoor umbrella according to the above preferred embodiment of the present invention.

FIG. 9 illustrates a slight alternative of the outdoor umbrella in which awning frame 20 is movably coupled directly at the upper portion 111 of the hollow supporting shaft 11 for folding and unfolding, wherein the electrical appliances are mounted at the function umbrella hub 21 for performing the corresponding functions.

Figure 10A:
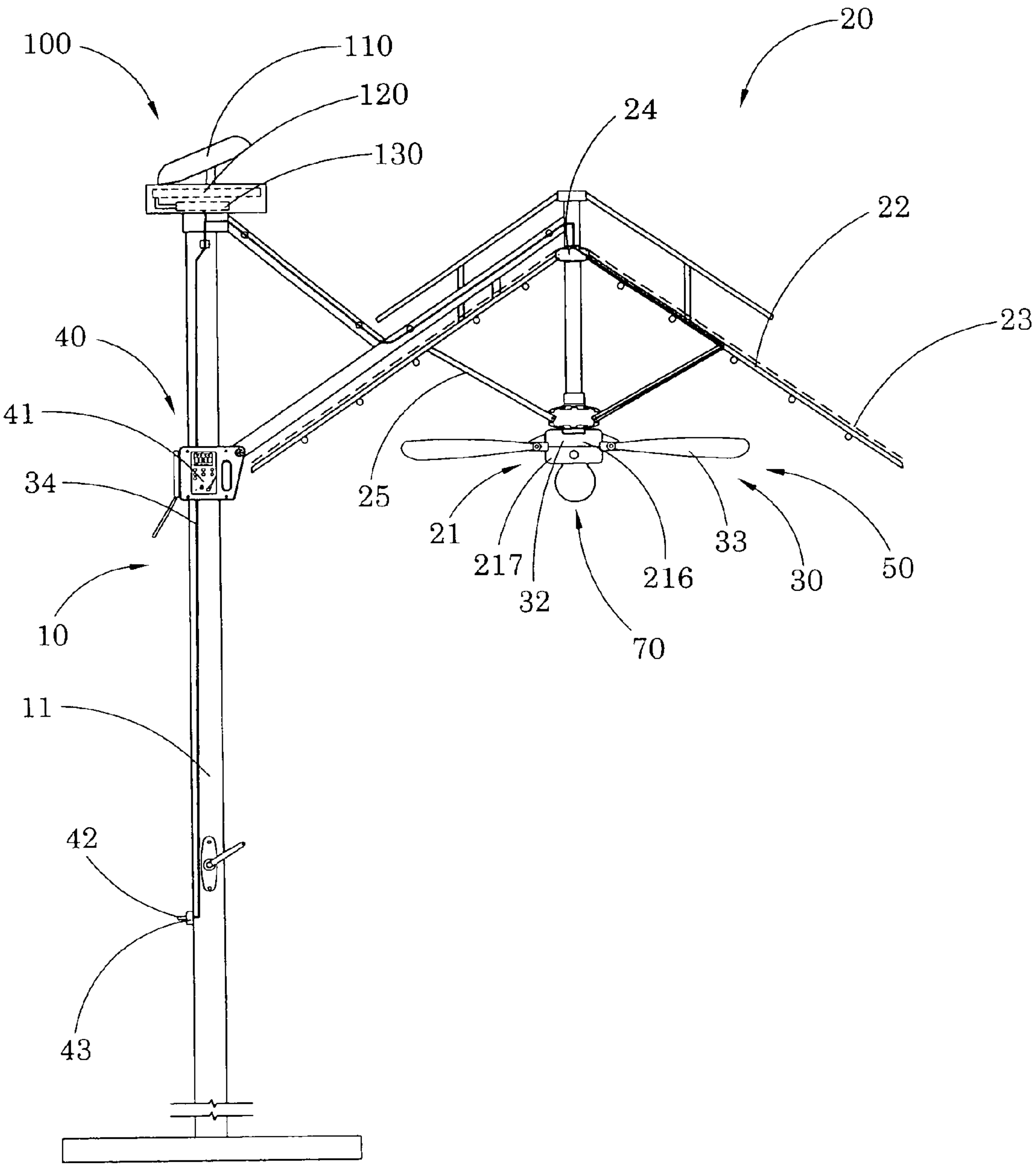
FIG. 10A and FIG. 10B are schematic diagrams of the outdoor umbrella according to the above preferred embodiment of the present invention, illustrating that the control panel can be mounted on different position.
Figure 10B:
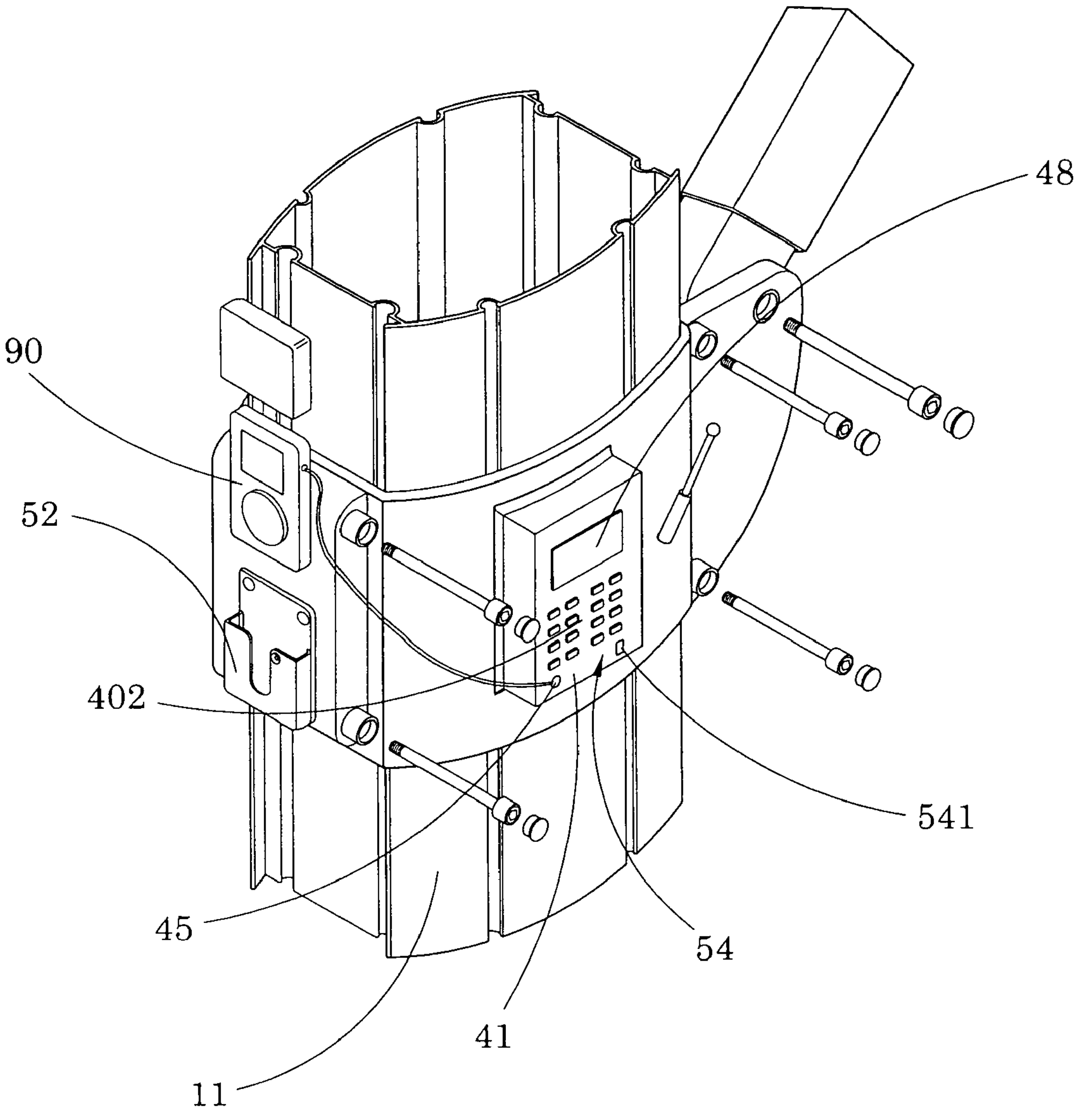

Referring to FIG. 10A and FIG. 10B of the drawings, the control panel 40 can also be mounted at an upper portion of the hollow supporting shaft 11 for controlling the different electrical appliances.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An outdoor umbrella, comprising:

a supporting frame;

a foldable awning frame which comprises a functional umbrella hub suspendedly supported by said supporting frame, a plurality of awning frames radially and outwardly extended from said functional umbrella hub, and an awning supported by said awning arms to define a shading area under said awning, wherein said functional umbrella hub has a speaker compartment and an audio outlet; and an audio system, as a built-in sound system, comprising:

a control panel comprising an auxiliary input for inputting an audio signal, said control panel is located at a position consisting of inside said functional umbrella hub and at said supporting frame at a distance greater than the radius of said awning frame from the top of said supporting frame;

a speaker unit supported within said speaker compartment of said functional umbrella hub to align with said audio outlet, wherein when said audio signal is input at said control panel, said audio signal is electrically communicated to said speaker unit for generating an audio sound as an additional function for said outdoor umbrella; and a wireless transmission link for wirelessly transmitting said audio signal from said control panel to said speaker unit, wherein said wireless transmission link comprises a wireless transmitter integrated with said control panel and a wireless receiver which is integrated with said speaker unit and is wirelessly communicating with said wireless transmitter to wireless transmit said audio signal from said control panel to said speaker unit.

2. The outdoor umbrella, as recited in claim 1, wherein said control panel is supported at said supporting frame, and comprises an auxiliary input for communicatively connecting to a portable music player to receive said audio signal therefrom such that said control panel transmits said audio signal to said speaker unit for music broadcasting, a control circuitry electrically communicated with said speaker unit to selectively operate and control said speaker unit, and a display screen electrically connected to said control circuitry for displaying an operation status thereof.

3. The outdoor umbrella, as recited in claim 1, wherein said supporting frame comprises a hollow supporting shaft having an upper portion coupling with said awning frame, wherein said audio system comprises an audio transmitting cable extending from said control panel to said speaker through said supporting shaft so as to transmit said audio signal from said control panel to said speaker unit via said audio transmitting cable.

4. The outdoor umbrella, as recited in claim 2, wherein said supporting frame comprises a hollow supporting shaft having an upper portion coupling with said awning frame, wherein said audio system comprises an audio transmitting cable extending from said control panel to said speaker through said supporting shaft so as to transmit said audio signal from said control panel to said speaker unit via said audio transmitting cable.

5. The outdoor umbrella, as recited in claim 1, wherein said functional umbrella hub further has a resonance chamber at said speaker compartment, wherein said speaker unit further comprises a subwoofer speaker supported at said resonance chamber for enhancing a sound quality of said audio sound output from said speaker unit.

6. The outdoor umbrella, as recited in claim 2, wherein said functional umbrella hub further has a resonance chamber at said speaker compartment, wherein said speaker unit further comprises a subwoofer speaker supported at said resonance chamber for enhancing a sound quality of said audio sound output from said speaker unit.

7. The outdoor umbrella, as recited in claim 4, wherein said functional umbrella hub further has a resonance chamber at said speaker compartment, wherein said speaker unit further comprises a subwoofer speaker supported at said resonance chamber for enhancing a sound quality of said audio sound output from said speaker unit.

8. The outdoor umbrella, as recited in claim 6, wherein said control panel comprises a radio broadcasting circuit for receiving radio wave as said audio signal, such that said control panel transmits said audio signal to said speaker unit for radio broadcasting.

9. The outdoor umbrella, as recited in claim 7, wherein said control panel comprises a radio broadcasting circuit for receiving radio wave as said audio signal, such that said control panel transmits said audio signal to said speaker unit for radio broadcasting.

10. The outdoor umbrella, as recited in claim 8, wherein said audio system further comprises a sealing holder mounted at said supporting frame at a position adjacent to said control panel for holding said portable music player in said sealing holder in a waterproof enclosing manner.

11. The outdoor umbrella, as recited in claim 9, wherein said audio system further comprises a sealing holder mounted at said supporting frame at a position adjacent to said control panel for holding said portable music player in said sealing holder in a waterproof enclosing manner.

12. The outdoor umbrella, as recited in claim 10, wherein said speaker unit comprises a plurality of speakers radially supported within said speaker compartment for creating a stereo surround sound effect when said audio signal is transmitted to said speaker unit.

13. The outdoor umbrella, as recited in claim 11, wherein said speaker unit comprises a plurality of speakers radially supported within said speaker compartment for creating a stereo surround sound effect when said audio signal is transmitted to said speaker unit.

* * * * *